(12) United States Patent
Lim et al.

(10) Patent No.: US 10,089,300 B2
(45) Date of Patent: Oct. 2, 2018

(54) APPARATUS AND METHOD FOR AMENDING LANGUAGE ANALYSIS ERROR

(71) Applicant: ELECTRONICS AND TELECOMMUNICATIONS RESEARCH INSTITUTE, Daejeon (KR)

(72) Inventors: Soo Jong Lim, Daejeon-si (KR); Hyun Ki Kim, Daejeon-si (KR); Sang Kyu Park, Daejeon-si (KR); Yong Jin Bae, Daejeon-si (KR); Chung Hee Lee, Daejeon-si (KR); Hyung Jik Lee, Daejeon-si (KR); Joon Ho Lim, Daejeon-si (KR); Myung Gil Jang, Daejeon-si (KR); Mi Ran Choi, Daejeon-si (KR); Jeong Heo, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/244,100

(22) Filed: Aug. 23, 2016

(65) Prior Publication Data

US 2017/0169009 A1 Jun. 15, 2017

(30) Foreign Application Priority Data

Dec. 15, 2015 (KR) .......................... 10-2015-0179528

(51) Int. Cl.
*G06F 17/27* (2006.01)
*G10L 15/01* (2013.01)
*G10L 15/32* (2013.01)

(52) U.S. Cl.
CPC ...... *G06F 17/2785* (2013.01); *G06F 17/2705* (2013.01); *G06F 17/278* (2013.01);
(Continued)

(58) Field of Classification Search
None
See application file for complete search history.

(56) References Cited

U.S. PATENT DOCUMENTS 7,809,568 B2 * 10/2010 Acero ............... G06F 17/30746
704/257
8,050,909 B2 * 11/2011 Oh ........................ G06F 17/279
704/1
(Continued)

FOREIGN PATENT DOCUMENTS

KR 10-2004-0089774 A 10/2004
KR 10-2015-0043065 A 4/2015

*Primary Examiner* — Richard Zhu
(74) *Attorney, Agent, or Firm* — LRK Patent Law Firm

(57) ABSTRACT

An apparatus for amending a language analysis error includes: a main language analyzer, which includes a plurality of language processing modules being sequentially connected to each other, and generates one best main analysis result for each processing module; a subsidiary language analyzer, which includes the plurality of language processing modules, and generates a plurality of subsidiary analysis results for each of the plurality of language processing modules; and an analysis result amender to in response to an error occurring in the main analysis result, acquire a subsidiary analysis result, and transmit the subsidiary analysis result to the main language analyzer.

12 Claims, 5 Drawing Sheets

(52) U.S. Cl.
CPC .......... *G06F 17/2755* (2013.01); *G10L 15/01* (2013.01); *G10L 15/32* (2013.01)

(56) References Cited

U.S. PATENT DOCUMENTS

| | | | | |
|---|---|---|---|---|
| 8,712,758 | B2* | 4/2014 | Crouch | G06F 17/2785 704/1 |
| 8,930,179 | B2* | 1/2015 | Chang | G06N 99/005 704/255 |
| 2004/0210437 | A1* | 10/2004 | Baker | G10L 15/08 704/251 |
| 2005/0203751 | A1* | 9/2005 | Stevens | G10L 15/22 704/276 |
| 2010/0004930 | A1* | 1/2010 | Strope | G10L 15/32 704/240 |
| 2011/0307241 | A1* | 12/2011 | Waibel | G10L 15/265 704/2 |
| 2013/0052240 | A1* | 2/2013 | Bellomo | C12N 5/0698 424/400 |
| 2014/0163959 | A1* | 6/2014 | Hebert | G06F 17/30684 704/9 |
| 2015/0254232 | A1* | 9/2015 | Ahmed | G06F 17/2785 704/9 |
| 2015/0364129 | A1* | 12/2015 | Gonzalez-Dominguez | G10L 15/005 704/251 |

* cited by examiner

APPARATUS AND METHOD FOR AMENDING LANGUAGE ANALYSIS ERROR

CROSS-REFERENCE TO RELATED APPLICATION(S)

This application claims priority from Korean Patent Application No. 10-2015-0179528, filed on Dec. 15, 2015, in the Korean Intellectual Property Office, the entire disclosure of which is incorporated herein by reference for all purposes.

BACKGROUND

1. Field

The following description relates to a natural language processing (NLP) technology, and more specifically, to an apparatus and method for amending a language analysis error.

2. Description of the Related Art

A deep language analysis technology is needed for an accelerated intelligent service, but if a complex language analysis, such as question answering, machine translation, a dialogue system, is required, language processing may be performed using various language analysis methods that are different from each other depending on a purpose.

However, a language analysis technology being used in general employs a method of sequentially performing a plurality of detailed analysis steps. For example, the detailed language analysis steps that are complex may be sequentially performed, such as a morphological analysis, named-entity recognition, word sense disambiguation, parsing, semantic role labeling, coreference resolution, zero anaphora recovery, and dialogue processing.

However, if the detailed analysis steps are sequentially performed as such, each of the detailed analysis steps is to analyze the language by using the analysis result of the previous step as input. Accordingly, if an error occurs in one analysis step, errors may occur all in the following analysis steps. For example, when a morphological analysis is performed with respect to a sentence "John likes a bird that flies the sky", if an error analysis on this sentence is performed, resulting in "John(proper noun) like(common verb)+s(plural suffix) a(indefinite article) bird(common noun) that(relative pronoun) fly(general noun)+-es(plural suffix) the(definite article) sky(common noun)", which indicates that the verb "fly" is wrongly analyzed as the common noun "fly (an insect)", its meaning is not found from the verb "fly", but from the noun "fly (an insect)" in performing a word sense disambiguation analysis. In other words, due to the dependence on an analysis result from the previous step, the analysis performance cannot help declining in an analysis step, and the more previous steps existing, the worse performance degradation.

As a plan to overcome such a phenomenon, proposed is a method of acquiring an analysis result from each step, not using an analysis result from the previous step as before. However, since in such a method, it is required to perform not only the n-th analysis but the analysis information of all the first to n-th analysis steps in the n-th analysis step, it may increase a level of process difficulty of each step, thereby making its implementation difficult. Also, in a case of the 7-th step, the previous steps are six, so that devising an access method is almost impossible.

In another plan, using a plurality of analysis results having each different access method, the best result among the plurality of analysis results is selected by majority. However, regarding the same problem, it is required to build a plurality of systems by devising various access methods, and obtain a result by simultaneously operating the plurality of systems in parallel, thereby resulting in complexity in its implementation. Also, the result obtained by the majority determination cannot be considered to be always right, so its analysis result is less accurate.

SUMMARY

The following description relates to an apparatus and method for amending a language analysis error to when a plurality of language analysis processes are performed, solve error propagation and accumulation phenomena caused by the dependence on an analysis result of a previous process.

The following description provides an apparatus and method for amending a language analysis error in order to improve an accuracy of error amendment, having a low level of difficulty in processing implementation.

In one general aspect, an apparatus for amending a language analysis error includes: a main language analyzer, which includes a plurality of language processing modules being sequentially connected to each other, and which in response to a document being input thereto, generates one best main analysis result for each processing module; a subsidiary language analyzer, which includes the plurality of language processing modules being sequentially connected in a same configuration as the main language analyzer, and which in response to the document being input thereto, generates a plurality of subsidiary analysis results for each of the plurality of language processing modules; and an analysis result amender to in response to an error occurring in the main analysis result, acquire a subsidiary analysis result corresponding to the main analysis result where the error occurs, and transmit the subsidiary analysis result to the main language analyzer, wherein the main language analyzer substitutes the main analysis result, where the error occurs, for the transmitted subsidiary analysis result and then re-performs a language analysis.

In another general aspect, a method of amending a language analysis error includes: generating one best main analysis result for each of a plurality of language processing steps by sequentially performing the plurality of language processing steps for an input document; generating several subsidiary analysis results for each of the plurality of language processing steps by sequentially performing the plurality of language processing steps for the input document; in response to an error occurring in the main analysis result, amending the main analysis result to a subsidiary analysis result corresponding to the main analysis result where the error occurs.

Other features and aspects may be apparent from the following detailed description, the drawings, and the claims.

Figure 1:
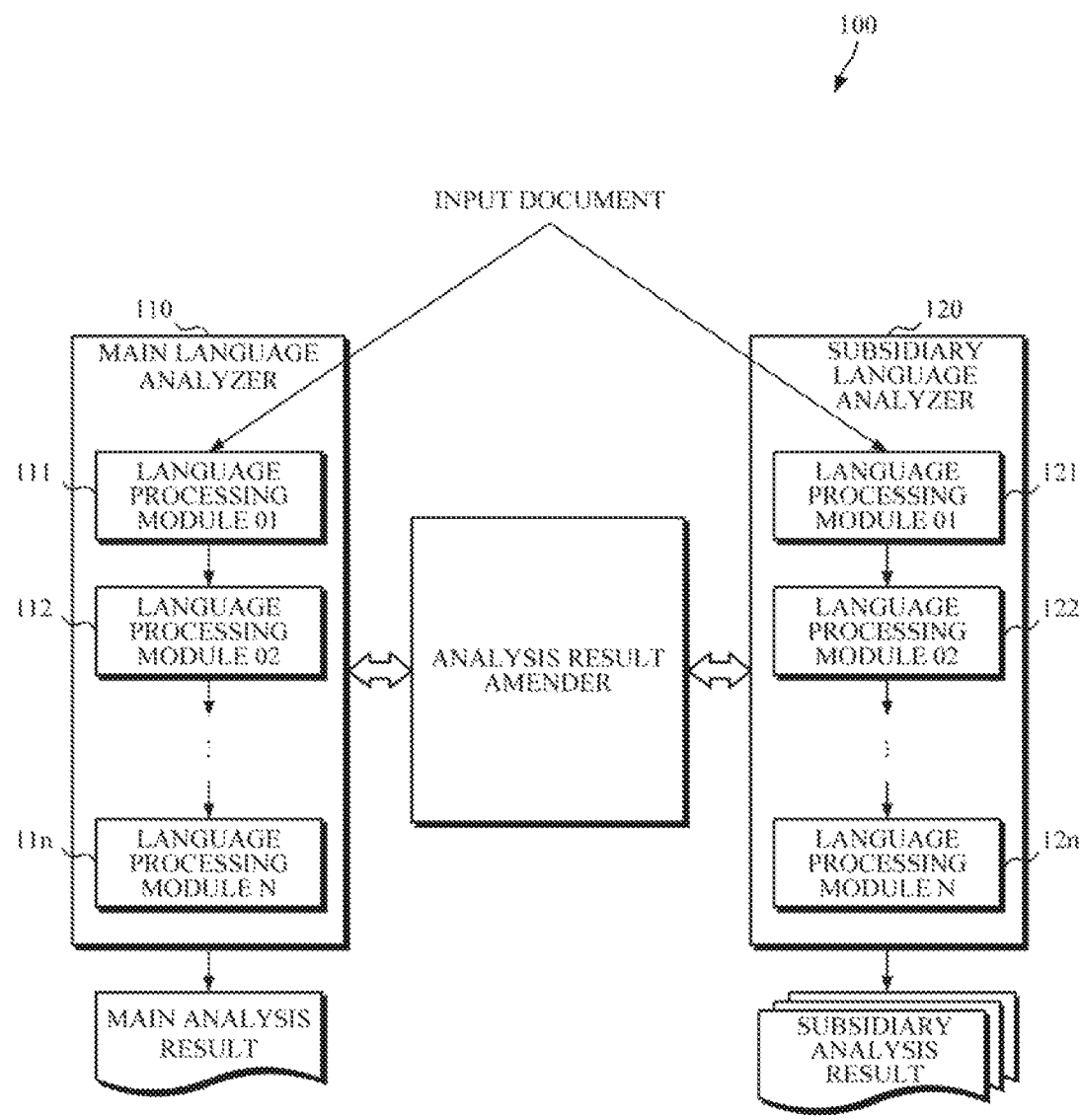
FIG. 1 is a diagram illustrating an apparatus for amending a language analysis error according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Terms used throughout this specification are defined. These terms are defined in consideration of functions according to exemplary embodiments, and can be varied according to a purpose of a user or manager, or precedent and so on. Therefore, definitions of the terms should be made on the basis of the overall context.

FIG. 1 is a diagram illustrating an apparatus for amending a language analysis error according to an exemplary embodiment.

Referring to FIG. 1, an apparatus 100 for amending a language analysis error enables a main language analyzer 110 and a subsidiary language analyzer 120 to simultaneously perform the respective language analyses of the same document in parallel, and then amend an error generated from the main language analyzer 110 to an analysis result from the subsidiary language analyzer 120.

The main language analyzer 110 includes a plurality of language processing modules 111, 112, . . . , and 11n, which are sequentially connected to each other, and in response to a document being input thereto, generates one best main analysis result for each of the language processing modules 111, 112, . . . , and 11n.

The subsidiary language analyzer 120 has the same configuration as the main language analyzer 110, including a plurality of language processing modules 121, 122, . . . , and 12n, which are sequentially connected to each other, and in response to a document being input thereto, generates a plurality of subsidiary analysis results for each language processing modules 121, 122, . . . , and 12n. In other words, the subsidiary language analyzer 120 may repeatedly perform a language analysis of the document a several times, and so generate a plurality of subsidiary analysis results from each of the plurality of language processing modules 121, 122, . . . , 12n.

In a case where it is determined that an error has occurred in the main analysis result, the analysis result amender 130 acquires a subsidiary analysis result corresponding to the main analysis result where the error has occurred, and transmits the subsidiary analysis result to the main language analyzer 110. Then, the main language analyzer 110 substitutes the main analysis result for the received subsidiary analysis result, and re-performs the language analysis.

Figure 2:
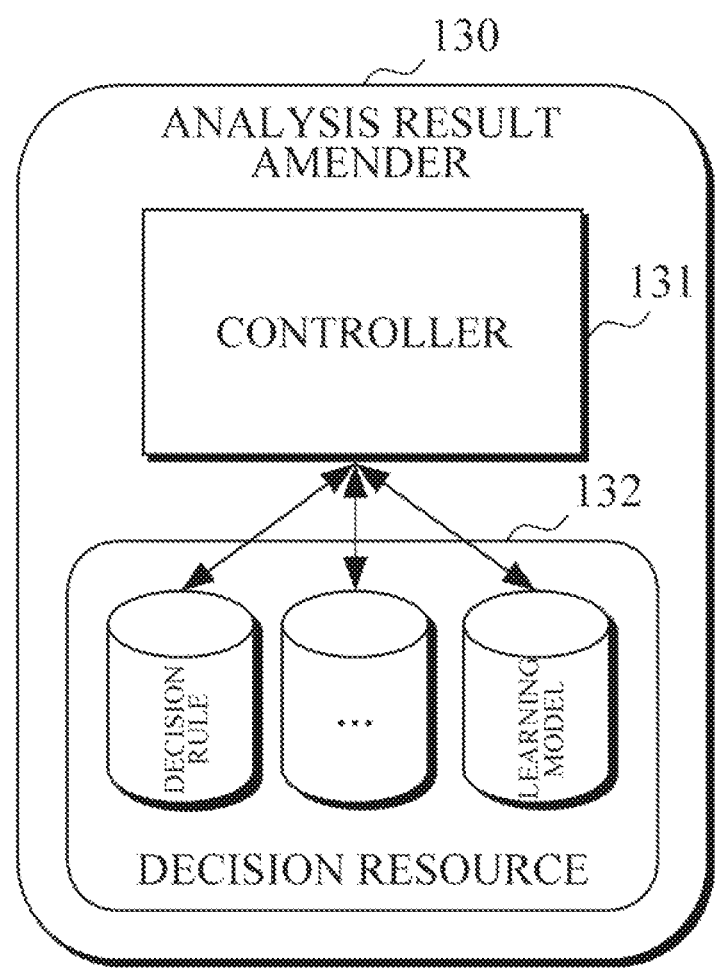
FIG. 2 is a diagram illustrating the inside of an analysis result amender according to an exemplary embodiment.

FIG. 2 is a diagram illustrating the inside of an analysis result amender according to an exemplary embodiment.

Referring to FIG. 2, an analysis result amender 130 includes a controller 131 and a decision resource 132.

The controller 131 determines whether there is a contradiction between main analysis results; determines a candidate of a language processing module that has generated an error, which is the cause of the contradiction; acquires a subsidiary analysis result, different from the main analysis result, from a language processing module of the subsidiary language analyzer 120 corresponding to the candidate; and transmits such acquired subsidiary analysis result to a language processing module of the main language analyzer 110. Here, among other subsidiary analysis results, except for the main analysis result, where the error has occurred, the subsidiary analysis result selected as the second-best one is transmitted.

Here, according to a predetermined decision rule, the controller 131 determines whether there is a contradiction between the main analysis results and determines a candidate of a language processing module, which is the cause of the contradiction. Such a decision rule is stored in a decision resource 132, which may store a learning model, etc., as well as the decision rule. In other words, the controller 131 may determine whether there is a contradiction between the main analysis results, and determine a candidate of the language processing module, which is the cause of the contradiction, by using a machine learning technique.

Figure 3:
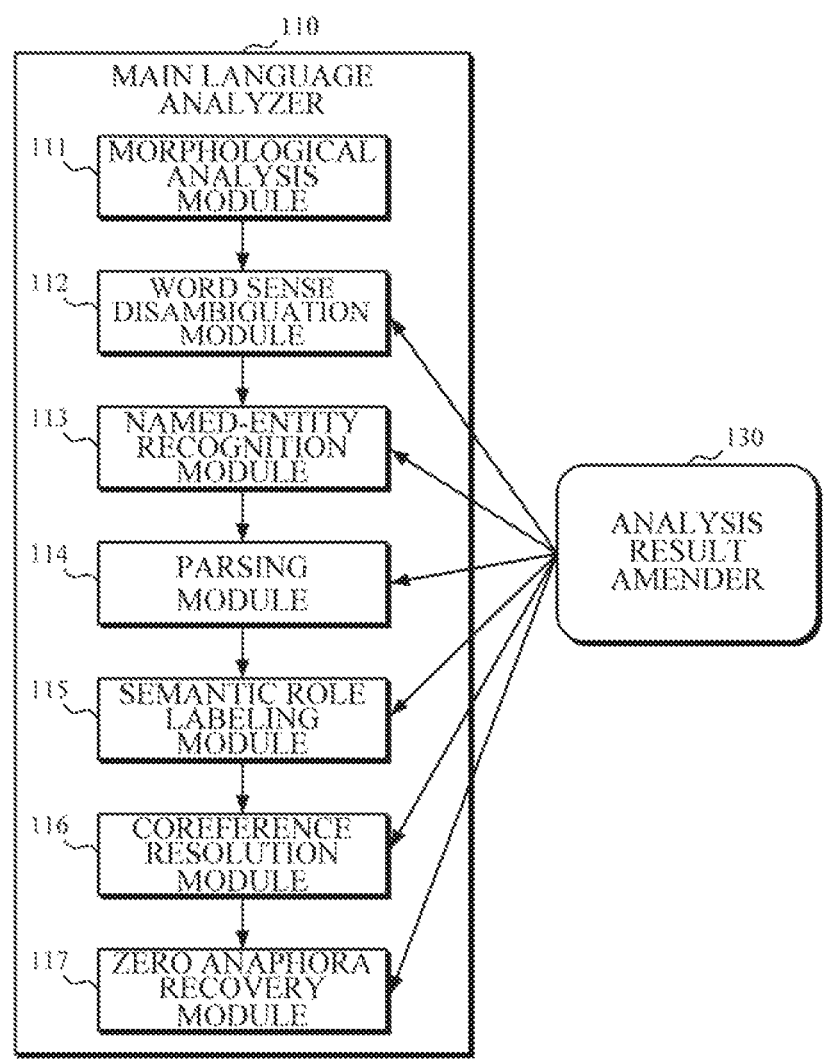
FIG. 3 is a diagram illustrating an example of a case in which an error does not occur in a main analysis result.

Then, hereinafter, examples of amending a language analysis error, which is performed by an apparatus 100 for amending a language analysis error, are described with reference to FIGS. 3 and 4. FIG. 3 is a diagram illustrating an example of a case in which an error does not occur in a main analysis result; and FIG. 4 is a diagram illustrating an example of a case in which an error occurs in a main analysis result.

Figure 4:
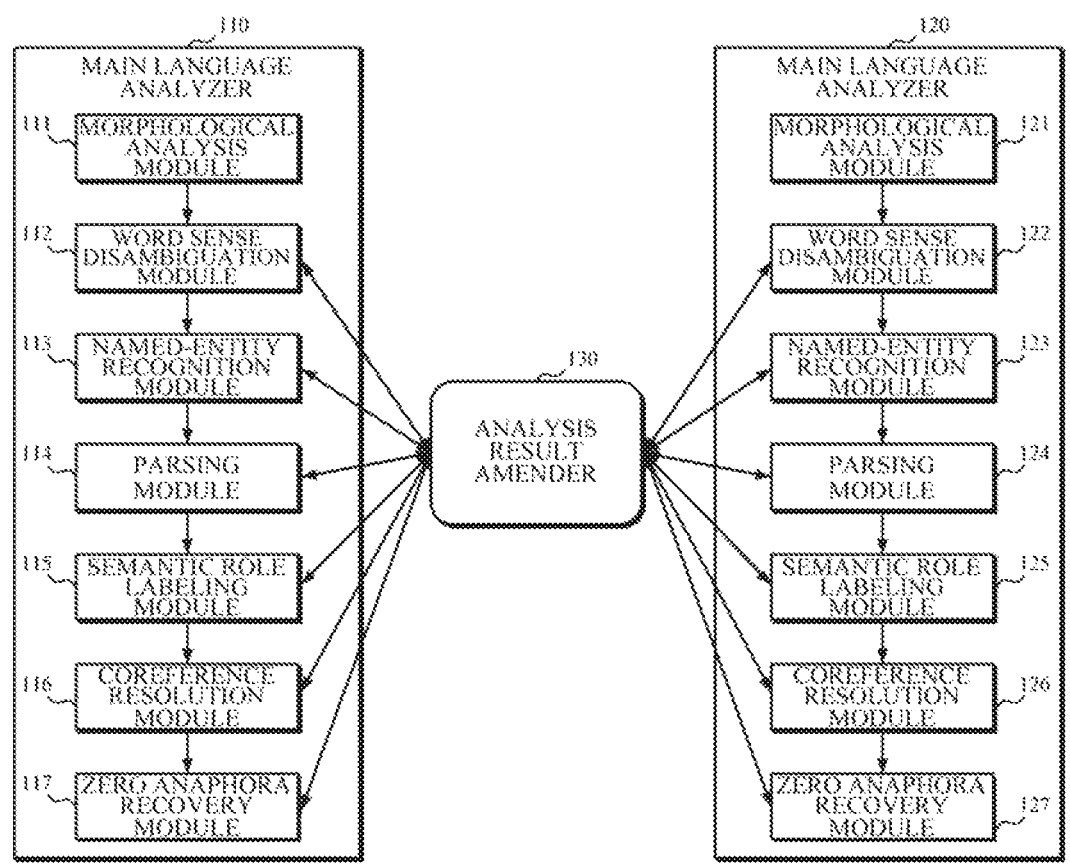
FIG. 4 is a diagram illustrating an example of a case in which an error occurs in a main analysis result.

In FIGS. 3 and 4, the main language analyzer 110 and the subsidiary language analyzer 120 are each the modules of processing a plurality of languages, which include, respectively, morphological analysis modules 111 and 121; word sense disambiguation modules 112 and 122; named-entity recognition modules 113 and 123; parsing modules 114 and 124; semantic role labeling modules 115 and 125; coreference resolution modules 116 and 126; and intangible substitute recovery modules 117 and 127. However, this constitution is just one example thereof for the convenience of description, and the present disclosure is not limited thereto. Also, since operations illustrated in FIGS. 3 and 4 are well-known, the detailed description thereof is omitted here.

Referring to FIG. 3, the analysis result amender 130 determines whether an error occurs based on a main analysis result by the word sense disambiguation module 112 that is a second step of the main language analyzer 110. That is, that is because whether there is a contradiction between the main analysis results cannot be found only with the main analysis result. If there is no contradiction in the main analysis result of the word sense disambiguation module 112, the analysis result amender 130 give an execution command to the named-entity recognition module 113, which is the next step thereof. Then, the analysis result amender 130 compares the main analysis result of the named-entity recognition module 113 to the main analysis results of the previous steps, and so determines whether the error has occurred. Based on the determination result, if the error does not occur, the analysis result amender 130 gives an execution command to the parsing module 114, which is the next stem thereof. In the same manner as above, the analysis result amender 130 repeatedly determines whether an error occurs until the intangible substitute recovery module 117 finishes its operation, and finally generates a language analysis result.

However, in another exemplary embodiment, after finishing their analyses, all the language processing modules of the main language analyzer 110 may determine whether an error occurs. As described above, if every language processing module determines whether an error occurs every time the operation is finished, the main language analyzer 110 is required to wait for an analysis result of the subsidiary language analyzer 120 to perform the next step, thereby resulting in a delay. That is, the main language analyzer 110 derives only the one-time best result, but the subsidiary language analyzer 120 performs analysis processes several times, and so the speed of the subsidiary language analyzer 120 may be slower than the main language analyzer 110. Accordingly, the analysis result amender 130 may find a contradiction by using all the main analysis results, find the language processing module that generates an error, which is the cause of the found contradiction, and give a command so that a language analysis may be re-performed from the corresponding language processing module.

Referring to FIG. 4, if there is a contradiction found among the main analysis results, the analysis result amender 130 determines a candidate of the language processing module that has generated the contradiction. Then, the analysis result amender 130 acquires the second-best subsidiary analysis result from the language processing module of the subsidiary language analyzer 120, which corresponds to the determined candidate of the language processing module, and transmits such second-best subsidiary analysis result to the language processing module of the main language analyzer 110.

For example, described is a case where the contradiction has occurred between the analysis results of the word sense disambiguation module 112 and the parsing module 114. With regard to a sentence "A warrior uses a bow", in a case where the morphological analysis module 111 analyzes such sentence as a subject of "use" being "a warrior", and an object being "a bow", and in a case where the word sense disambiguation module 112 analyzes the word "bow" as not "a flexible arc which shoots aerodynamic projectiles called arrows", but "a formal way of greeting people or showing respect", it is impossible for the parsing module 114 to analyze the word "bow" as not "the flexible arc" but "the formal greeting way" due to a selective constraint of "use", thus resulting in a generation of a contradiction between the analysis results of the word sense disambiguation module 112 and the parsing analysis module 114. Then, the analysis result amender 130 determines that an error has occurred in the word sense disambiguation module 112 according to a predetermined decision rule, acquires another subsidiary analysis result, except for the result of "the formal greeting way", from the word sense disambiguation module 122 of the subsidiary language analyzer 120, and transmits such subsidiary analysis result to the word sense disambiguation module 112 of the main language analyzer 110. Then, the word sense disambiguation module 112 transmits such subsidiary analysis result to the next step so as not to propagate the error to the next step.

In another example, described is a case where the contradiction has occurred between the analysis results of the morphological analysis module 111 and the named-entity recognition module 113. With regard to a certain word generated in a sentence, if the morphological analysis module 111 analyzes the certain word as a proper noun, and if the named-entity recognition module 113 analyzes so the certain word is not a named-entity, a contradiction may occur between the analysis results of the morphological analysis module 111 and the named-entity recognition module 113. Then, the analysis result amender 130 determines that an error has occurred in the named-entity recognition module 113 according to a predetermined decision rule, acquires a subsidiary analysis result of the certain word from the named-entity recognition module 123 of the subsidiary language analyzer 120, and transmits such subsidiary analysis result to the named-entity recognition module 113 of the main language analyzer 110. Then, the named-entity recognition module 113 transmits such subsidiary analysis result to the next step so as not to propagate an error to the next step.

Next, described is a method of amending a language analysis error. However, there may be various types of exemplary embodiments thereof, wherein amending a language analysis error may be performed every time a language processing step is complete, or after all language processing steps are complete. For the convenience of description, with reference to FIG. 5 below, described is an example of amending a language analysis error after all language processing steps are complete.

Figure 5:
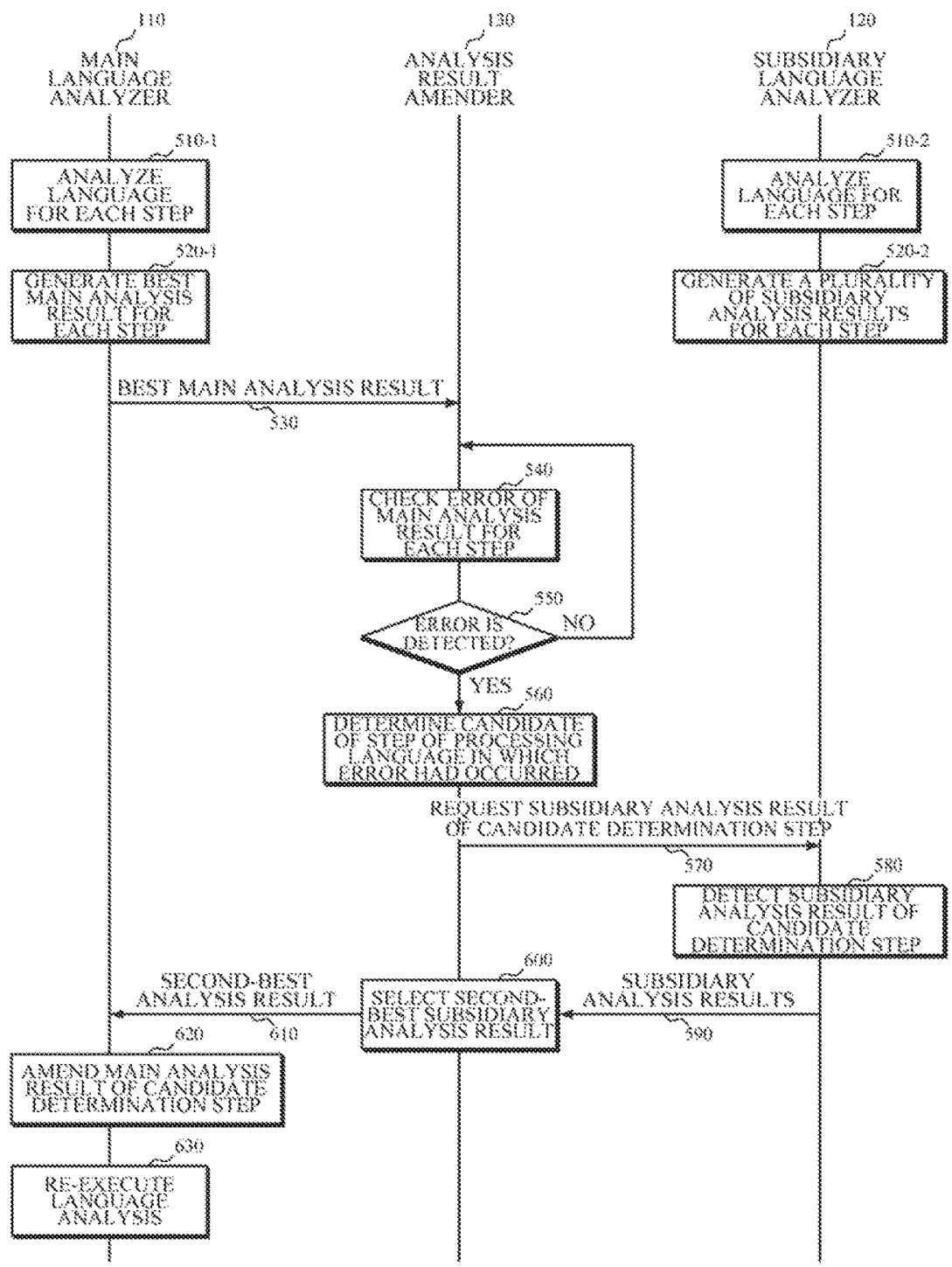
FIG. 5 is a signal flowchart illustrating a method of amending a language analysis error according to an exemplary embodiment.

FIG. 5 is a signal flowchart illustrating a method of amending a language analysis error according to an exemplary embodiment.

Referring to FIG. 5, an apparatus for amending a language analysis error enables a main language analyzer 110 and a subsidiary language analyzer 120 to simultaneously perform the respective language analyses of the same document in parallel in 510-1 and 501-2.

The main language analyzer 110 sequentially performs a plurality of language processing steps, and in response to the document being input thereto, generates one best main analysis result for each of the plurality of language processing modules in 520-1.

The subsidiary language analyzer 120 sequentially performs the plurality of language processing steps, and in response to the document being input thereto, generates a plurality of subsidiary analysis results for each of the plurality of language processing steps in 520-2. To this end, the subsidiary language analyzer 120 repeatedly performs the language analysis of the document.

If the main analysis result is transmitted from the main language analyzer 110 to the analysis result amender 130 in 530, the analysis result amender 130 checks whether an error occurs for each step in 540, and then determines whether the error has been detected in 540. That is, it is determined whether there is a contradiction between the main analysis results.

If it is determined that an error is not to be detected, the analysis result amender 130 goes back to operation 540 and then determines whether there is an error in the next language processing step in 540. Meanwhile, if it is determined that the error is detected in 550, the analysis result amender 130 determines a candidate of a language processing step where the error occurs in 560.

However, in operations 540 to 560, according to a predetermined decision rule, the analysis result amender 130 determines whether there is a contradiction between the main analysis results and determines a candidate of a language processing module, which is the cause of the contradiction. Such a decision rule is stored in a decision resource 132, which may store a learning model, etc., as well as the decision rule. In other words, the analysis result amender 130 may determine whether there is a contradiction between the main analysis results, and determine a candidate of the language processing module, which is the cause of the contradiction, by using a machine learning technique.

Then, the analysis result amender 130 requests subsidiary analysis results of the language processing step, where the error has occurred, to the subsidiary language analyzer 120 in 570, and the subsidiary language analyzer 120 detects the corresponding subsidiary analysis results in 580 and transmits such subsidiary analysis to the analysis result amender 130 in 590.

Then, the analysis result analyzer 130 selects a second-best subsidiary analysis result among the other subsidiary analysis results except for the main analysis result where the error has occurred in 600, and transmits the second-best subsidiary analysis result to the main language analyzer 110 in 610.

Then, the main language analyzer 110 substitutes the main analysis result, where the error has occurred, for the received subsidiary analysis result in 620 and re-performs a language analysis in 630.

Provided is an apparatus and method for amending a language analysis error to when sequentially performing a plurality of language analysis steps, solve an error propagation and accumulation phenomena caused by the dependence on an analysis result of a previous process. The present disclosure improves an accuracy of error amendment, having a low level of difficulty in processing implementation. Accordingly, if the present disclosure is used as a language analysis technology in a various intelligent service, such as question answering system, machine translation, a dialogue processing system, a related market may be even more activated through an improvement in a quality of an intelligent service.

What is claimed is:

1. An apparatus for amending a language analysis error, the apparatus comprising:
   one or more computer-executable modules being configured and executed by a controller using algorithms associated with at least one non-transitory storage device, the algorithms, when executed, causing the controller to execute one or more analyzers and an amender, the analyzers and amender comprising,
   a main language analyzer comprising a plurality of language processing modules being sequentially connected to each other, and in response to receipt of an input of a document, the main language analyzer configured to generate a main analysis result for each processing module;
   a subsidiary language analyzer comprising the plurality of language processing modules being sequentially connected in a same configuration as the main language analyzer, and in response to the document being input, the subsidiary language analyzer configured to generate a plurality of subsidiary analysis results for each of the plurality of language processing modules; and
   in response to an error occurring in the main analysis result, an analysis result amender configured to acquire a subsidiary analysis result corresponding to the main analysis result where the error occurs, and to transmit the subsidiary analysis result to the main language analyzer, wherein the main language analyzer is configured to substitute the main analysis result with the subsidiary analysis result and to re-perform a language analysis, wherein the substitution is performed by the analysis result amender with the following procedures:
   to determine whether or not there is a contradiction between the main analysis results,
   in response to detection of the contradiction, to determine whether the error of the language processing modules causing the contradiction,
   to acquire a subsidiary analysis result which being different from the main analysis result and
   to transmit the subsidiary analysis result to the language processing modules of the main language analyzer.

2. The apparatus of claim 1, wherein the main language analyzer and the subsidiary language analyzer are configured to receive an identical document and simultaneously perform respective language analyses in parallel.

3. The apparatus of claim 1, wherein the subsidiary language analyzer is configured to repeatedly perform a language analysis of the document several times.

4. The apparatus of claim 1, wherein the analysis result amender further comprises:
   a decision resource to store a predetermined decision rule, and is configured to determine whether there is the contradiction between the main analysis results by using the predetermined decision rule and determine the candidate of the language processing module causing the contradiction.

5. The apparatus of claim 1, wherein the analysis result amender is configured to select a second-beset subsidiary analysis result except for the main analysis result among the plurality of subsidiary analysis results, and transmit the second-best subsidiary analysis result to the main language analyzer.

6. The apparatus of claim 1, wherein the analysis result amender is configured to determine whether the error occurs by acquiring an analysis result from a main analysis result of a second language processing module.

7. A computer-implemented method of amending a language analysis error, the method is performed by using one or more computer-executable modules which being configured and executed by a controller using algorithms associated with at least one non-transitory storage device, the algorithms, when executed, causing the controller to execute one or more analyzers and an amender, the method comprising:
   a main language analyzer comprising a plurality of language processing modules being sequentially connected to each other, and in response to receipt of an input of a document, generating, by the main language analyzer, a main analysis result for each processing module;
   a subsidiary language analyzer comprising the plurality of language processing modules being sequentially connected in a same configuration as the main language analyzer, and in response to the document being input, generating, by the subsidiary language analyzer, a plurality of subsidiary analysis results for each of the plurality of language processing modules; and
   in response to an error occurring in the main analysis result, by an analysis amender, acquiring a subsidiary analysis result corresponding to the main analysis result where the error occurs, and transmitting the subsidiary analysis result to the main language analyzer, wherein the main analysis result is substituted with the subsidiary analysis result by the main language analyzer and re-performing a language analysis, wherein the substitution is performed by the analysis result amender with the following procedures:
   determining whether or not there is a contradiction between the main analysis results, in response to detection of the contradiction, determining whether the error of the language processing modules causing the contradiction, acquiring a subsidiary analysis result which being different from the main analysis result and transmitting the subsidiary analysis result to the language processing modules of the main language analyzer.

8. The method of claim 7, further comprises:

receiving an identical document and simultaneously performing respective language analyses in parallel.

9. The method of claim 7, wherein the subsidiary analysis results are generated by repeatedly performing a language analysis of the document several times.

10. The method of claim 7, further comprises:

determining whether there is the contradiction between the main analysis results by using a predetermined decision rule, and determining the candidate of the language processing step, which causes the contradiction.

11. The method of claim 7, further comprises:

selecting a second-best subsidiary analysis result except for the main analysis result among the plurality of subsidiary analysis results.

12. The method of claim 7 further comprises:

determining whether the error occurs by acquiring an analysis result from a second language processing step.

* * * * *